United States Patent [19]
King et al.

[11] Patent Number: 5,958,013
[45] Date of Patent: Sep. 28, 1999

[54] APPARATUS, METHODS AND COMPUTER PROGRAM PRODUCTS FOR CONDUCTING A PERSISTENT SESSION WITH A HOST-BASED APPLICATION

[75] Inventors: Thomas Francis King, Louisville, Colo.; Bradley Thomas Marchesseault, Cary, N.C.; Thomas Owings Rowe, Chapel Hill, N.C.; Yih-Shin Tan, Raleigh, N.C.

[73] Assignee: International Business Machines Corporation, Armonk, N.Y.

[21] Appl. No.: 08/927,777

[22] Filed: Sep. 11, 1997

[51] Int. Cl.[6] .................................................. G06F 17/00
[52] U.S. Cl. .......................................... 709/227; 709/250
[58] Field of Search .............................. 395/500, 200.55, 395/200.8; 709/221, 222

[56] References Cited

U.S. PATENT DOCUMENTS 5,754,830   5/1998   Butts et al. .............................. 395/500

OTHER PUBLICATIONS

Université de Genève website, www.unige.ch/hotjava, "TN3270 Java Emulator and Libraries" (No Date).

Sun Microsystems website, Java.sun.com, "HotJava" (Not Date).

*Primary Examiner*—Ellis B. Ramirez

*Attorney, Agent, or Firm*—Myers Bigel Sibley & Sajovec; Jeanine S. Ray-Yarletts

[57] ABSTRACT

A session is conducted with an application resident on a host computer by loading terminal information at a computer, operatively associated with the host computer and which is part of a network including a plurality of resource locations, from a host access resource location of the plurality of resource locations. The terminal emulation information is processed to conduct a session between the computer and the application. A resource location of the plurality of resource locations is then accessed from the computer while the session persists. The terminal emulation information may be downloaded to the computer from a server of the network. According to one aspect, a common environment capable of being produced under a plurality of different computer operating systems, e.g., a Java environment, is produced at the computer. The terminal emulation information is processed under the common environment to thereby conduct a session between the computer and the application. According to another aspect, the terminal emulation information is processed to instantiate a Session Object at the computer, the Session Object being configured to conduct the session between the computer and the application. A plurality of host access processing objects may be instantiated from the Session Object, the host access processing objects being configured to conduct the session between the computer and the application and having methods which are accessible to an application resident at the computer. A Session Vector which identifies the instantiated Session Object may also be instantiated.

46 Claims, 6 Drawing Sheets

APPARATUS, METHODS AND COMPUTER PROGRAM PRODUCTS FOR CONDUCTING A PERSISTENT SESSION WITH A HOST-BASED APPLICATION

FIELD OF THE INVENTION

The present invention relates to data processing apparatus (systems), methods and computer program products, more particularly, to apparatus, methods and computer program products for interfacing with host-based applications.

BACKGROUND OF THE INVENTION

The Internet is a decentralized network of computers that can communicate with one another via a transmission control protocol/internet protocol (TCIP/IP). Although the Internet has its origins in a network created by the Advanced Research Project Agency (ARPA) in the 1960's, it has only recently become a worldwide communication medium. To a large extent, the explosive growth in use of the Internet is due to the development in the early 1990's of the worldwide Web (WWW), which is one of several service facilities provided on the Internet. Other facilities include a variety of communication services such as electronic mail, telnet, usenet newsgroups, internet relay chat (IRC), a variety of information search services such as WAIS and Archie, and a variety of information retrieval services such as FTP (file transfer protocol) and Gopher.

The WWW is a client-server based facility that includes a number of servers (computers connected to the Internet) on which Web pages or files reside, as well as clients (Web browsers) which interface the users with the Web pages. Specifically, Web browsers and software applications such as WebExplorer® (IBM Corporation) or Navigator® (Netscape Communication Corporation) send a request over the WWW to a server requesting a Web page identified by a Uniform Resource Locator (URL) which notes both the server where the Web page resides and the file or files on that server which make up the Web page. The server then sends a copy of the requested file(s) to the Web browser, which in turn displays the Web page to the user.

The Web pages on the WWW may be hyper-media documents written in a standardized language called HyperText Markup Language (HTML). A typical Web page includes text together with embedded formatting commands, referred to as tags, which can be used to control font size, font style and the like. A Web browser parses the HTML script in order to display the text in accordance with the specified format.

Although many new computer applications are being developed for distributed processing environments such as the Web, there is still a large installed base of traditional computer systems having an architecture including a central host computer, typically a mainframe, and "dumb" computer terminals which are directly connected to ports of the host computer. Examples of such a configuration include 3270, 5250 and VT configurations in which a terminal communicates with a host according to a variety of networking protocols such as SNA or TCP/IP. A networking protocol typically provides for structured organization of a data stream to include a series of control characters followed by a block of displayable characters, a typical data stream comprising a plurality of sequentially transmitted control character blocks followed by displayable character blocks.

Because of the continued presence of such host-based applications, there is a need for techniques to integrate host-based content into the Web paradigm. For example, many companies have centralized information databases, services and the like which are accessible to employees from terminals or personal computers running terminal emulation software. Many companies desire to make this content accessible to customers through the Internet or to employees through an "intranet" which has a Web-like structure and user interface.

Conventional approaches for providing such access typically use conversion/translation techniques that employ emulation software resident at an intermediate Web server. Additional code typically executes on top of the emulation software that is capable of establishing a session from the intermediate server to a host and converting emulation screen output/input into a format understood by the browser, such as HTML files, Java GUI applets, or ActiveX controls. The intermediate code typically employs a private protocol to control the exchange of data between the server and browser in the converted format.

There are several potential problems with this technique. For example, use of an intermediate server may make it difficult to navigate a host session as if it were an integral part of a browser environment. The state of the host session typically is not maintained in real time on the browser, so user may respond to an inappropriate screen. In addition, when a user leaves a session to surf other Web pages and comes back, the session may be disconnected or disrupted.

The use of the intermediate server may also introduce security and other management problems. A session typically remains open on the intermediate server, allowing unauthorized parties to gain access to and control over the session. The intermediate server software may also introduce problems in managing sessions, a function which generally is better left to host communications server software which has session-based resource tuning and load balancing capabilities. In addition, the software used on the intermediate server typically is a closed, platform-specific executable program which may be inaccessible to developers seeking to develop related applications.

SUMMARY OF THE INVENTION

In light of the foregoing, it is an object of the present invention to provide apparatus, methods and computer program products for conducting a session between a computer and a host-based application which do not require mediation of a session by an intermediate server.

It is another object of the present invention to provide apparatus, methods and computer program products for conducting a session between a computer and a host-based application that can provide industrial-standard open solutions.

It is another object of the present invention to provide apparatus, methods and computer program products for conducting a session between a computer and a host-based application which persists notwithstanding subsequent access of different resource locations, e.g., Web pages, by the computer.

It is another object of the present invention to provide apparatus, methods and computer program products for conducting a session between a computer and a host-based application which use an architecture that is accessible to other applications resident at the computer.

These and other objects, features and advantages are provided according to the present invention by apparatus (systems), methods and computer program products in which a computer loads terminal emulation information from a host access resource location, e.g., Web page, of a network including the computer, and processes the loaded terminal emulation information to conduct a session with an application on a host computer. The terminal emulation information is configured such that is causes the session to persist when the computer subsequently accesses a resource location of the network. Processing of the terminal emulation information preferably causes the instantiation of an object structure at the computer that is accessible to other applications resident at the computer.

The downloaded terminal information may be automatically processed upon downloading from a server to automatically establish a session between the remote computer and the application, or a user input may be accepted to initiate a session. For example, a user may access a location identified by a Uniform Resource Locator (URL) by selecting an HTML link from a Web page displayed on the computer. Selection of the URL may cause an applet to be downloaded from the server and processed in a Java environment on the computer to conduct a persistent session between the computer and the host-based application. Alternatively, means may be provided in the Web page for accepting user selection of a configuration option for a session, and for conducting a session according to the selected configuration option.

By storing terminal emulation information which can be run on a wide variety of platforms and which is may be downloaded on demand, the present invention offers improved security and management without requiring modification of existing network configurations or special intermediate software or hardware. By making sessions persist during access of resource locations by the computer, the context of a session may be preserved when a user at the computer "surfs" among Web pages.

The present invention also offers a solution which is platform independent and dynamic, which can be plugged into other networking solutions easily and which has an object-oriented structure which offers flexibility for software developers to develop customized applications.

The present invention takes advantage of platform-independent processing environments such as Java technology and its applet download capability. This technology can be used to create a processing structure that breaks the traditional session model into several discrete self-contained processing points or objects. These objects may be implemented as Java class files, with a class library being installed on a server path of a Web server home directory structure. A Web administrator can simply set up a URL pointing to a default Host On-Demand applet initiation HTML page. When Web users click on this URL to get the page, it can cause a download of required Java class files from the Web server to run in the Web user's memory and automatically establish a session from the Web user to a host-based application which can have end-to-end persistent characteristics similar to a session established from a resident emulation package. Because the Host On-Demand code can be simply plugged into an existing environment, extensive software modifications are not required and system management functions can be left to existing communication servers.

In particular, according to the present invention, a session is conducted with an application resident on a host computer by loading terminal information at a computer, operatively associated with the host computer and which is part of a network including a plurality of resource locations, from a host access resource location of the plurality of resource locations. The loaded terminal emulation information is processed to conduct a session between the computer and the application. A resource location of the plurality of resource locations is then accessed from the computer while the session persists. The computer may have a browser resident thereat which is operative to access the plurality of resource locations, and the terminal emulation information may be loaded by accessing the host access resource location from the browser. After the terminal information is processed to conduct a session, a resource location of the plurality of resource locations may then be accessed from the browser while the session persists. The terminal emulation information may be downloaded to the computer from a server of the network.

According to an aspect of the present invention, a common environment capable of being produced under a plurality of different computer operating systems is produced at the computer. The terminal emulation information is processed under the common environment to thereby conduct a session between the computer and the application. The common environment may comprise a Java environment and the terminal emulation information may comprise a Java applet.

According to another aspect of the present invention, the terminal emulation information is processed to instantiate a Session Object at the computer, the Session Object being configured to conduct the session between the computer and the application. A plurality of host access processing objects may be instantiated from the Session Object, the host access processing objects being configured to conduct the session between the computer and the application and having methods which are accessible to an application resident at the computer. A Session Vector which identifies the instantiated Session Object may also be instantiated.

According to another aspect, processing of the terminal emulation information causes a browser resident at the computer to display a host access Web page including a session configuration option. A user selection of the session configuration option from the host access Web page is accepted, causing the computer to conduct the session according to the selected configuration option.

A system for conducting a session with an application resident on a host computer includes a computer which is operatively associated with the host computer and which is part of a network including a plurality of resource locations. Means are provided for accessing information at the plurality of resource locations from the computer, the means for accessing including means for loading terminal emulation information at the computer from a host access resource location of the plurality of resource locations. The computer is configured to process the loaded terminal emulation information to conduct a session between the computer and the application which persists when the computer subsequently accesses a resource location of the plurality of resource locations. The means for accessing may comprise a browser, resident at the computer and operative to access the plurality of resource locations, which accesses the terminal emulation information at the host access resource location. The session conducted between the computer and the application is configured to persist when the browser subsequently accesses a resource location, e.g, another Web page, of the plurality of resource locations. The computer may be configured to automatically process the terminal emulation information in response to loading of the terminal emulation information at the computer.

In another embodiment according to the present invention, the computer is configured to produce a common environment capable of being produced under a plurality of different computer operating systems. The terminal emulation information comprises terminal emulation configured to be processed under the common environment. The computer is configured to process the loaded terminal emulation information under the common environment and thereby conduct a session between the computer and the application. The common environment may comprise a Java environment, and the terminal emulation information may comprise a Java applet. The means for accessing may comprise means, responsive to a request from the computer, for loading the Java applet at the computer. The computer may be configured to process the loaded Java applet under the Java environment to conduct a session between the computer and the application.

In another embodiment according to the present invention, the terminal emulation information is configured to cause the computer to instantiate a Session Object when processed at the computer, the Session Object being configured to conduct the session between the computer and the application. The Session Object may be configured to instantiate a plurality of host access processing objects which conduct the session between the computer and the application, the host access processing objects having methods which are accessible to an application resident at the computer. The terminal emulation information may also be configured to cause the computer to instantiate a Session Vector for identifying the instantiated Session Object.

In yet another embodiment, the terminal emulation information is configured to cause a browser at the computer to display a host access Web page including a session configuration option and to provide means for accepting a user selection of the session configuration option from the host access Web page. The terminal emulation information may be configured to cause the computer to conduct the session according to the selected configuration option.

An apparatus for conducting a session with an application resident on a host computer according to the present invention includes a computer configured to access a plurality of resource locations of a network including the computer, to load terminal information at the computer from a host access resource location of the network and to process the loaded terminal emulation information. Terminal emulation information is loaded at the computer, and is configured to be processed at the computer to conduct a session between the computer and the application which persists when the computer subsequently accesses a resource location of the plurality of resource locations.

A computer program product for conducting a session with an application resident at a host computer according to the present invention includes a computer-readable program storage medium having computer-readable terminal emulation information embodied therein which is configured to be loaded at a computer connected to the host computer from a host access resource location of a network including the computer, and which is configured to be processed at the computer to thereby conduct a session with the application which persists when the computer subsequently accesses a resource location of the plurality of resource locations. The computer-readable terminal emulation information may comprise a Java applet configured to be processed under a Java environment at the computer.

Improved apparatus, methods and computer program products for conducting sessions with a host-based application are thereby provided.

BRIEF DESCRIPTION OF THE DRAWINGS

Some of the objects and advantages of the present invention having been stated, others will be more fully understood from the detailed description that follows and by reference to the accompanying drawings in which.

DETAILED DESCRIPTION OF PREFERRED EMBODIMENTS

Figure 1:
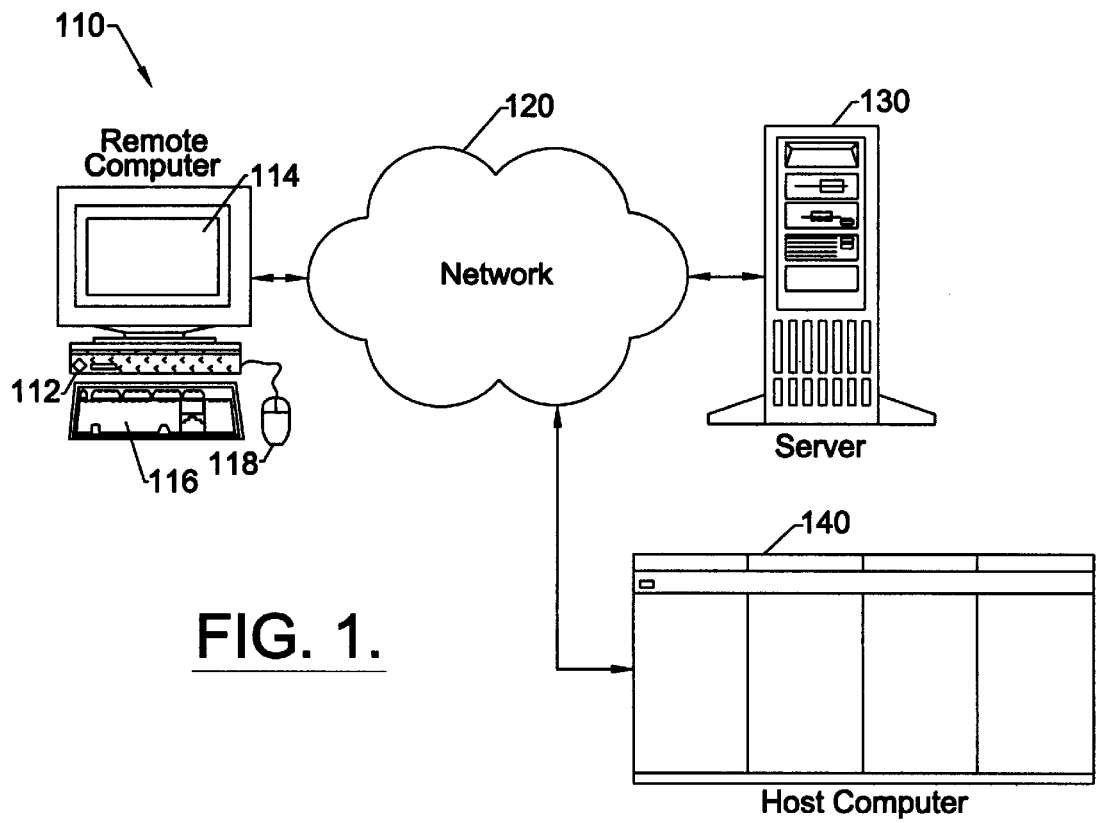
FIG. 1 is a schematic diagram illustrating a data processing system in which the methods and apparatus of the present invention may be embodied.

The present invention now will be described more fully hereinafter with reference to the accompanying drawings, in which embodiments of the invention are shown. Those skilled in the art will appreciate that the invention may be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

In the discussion that follows, reference is made to "application." For purposes of the discussion here, "application" refers to terminal-type host-based applications. These applications include, but are not limited to, such mainframe applications as 3270, 5250 and ASCII VT applications which use screen-type user interfaces to display and receive data from a user at a terminal connected to the mainframe computer.

The description herein also refers to "objects," i.e., processing structures created according to object-oriented programming principles. Those skilled in the art will appreciate that, in general, objects are programming models which generally are defined by "state" and "behavior." In the programming implementation of an object, the state of an object is defined by its fields, which may or may not be accessible from outside of the object. An object's behavior is defined by its methods, which manipulate instance variables (data for the object) to create new state, and which also can create new objects. Typically, the object's methods are the only means by which other objects can access or alter its instance variables, with objects interacting with one another via messages. Object-oriented programming techniques are utilized in many modern programming languages, including C++ and Java.

Those skilled in the art will appreciate that although the description herein makes use of object-oriented programming concepts, the present invention may be embodied using other techniques which may not be considered "object oriented." For example, the present invention may be implemented using more a traditional procedural framework that, in effect, embodies functionality also attainable using object-oriented principles. Accordingly, those skilled in the art will appreciate that the present invention is applicable to object-oriented and non-object-oriented environments.

To provide an example of an object-oriented environment in which the systems, methods and computer program products of the present invention may be embodied, the discussion herein describes a Java environment. Java is an object-oriented programming language developed by Sun Microsystems, Mountain View, Calif. Java is designed to be portable and architecturally neutral, making it advantageous for distributed processing applications in which computers having a variety of different operating systems are interconnected. Java source code is compiled into a machine-independent format that can be run on any platform with a Java runtime system known as the Java Virtual Machine (JVM). The JVM is a process that emulates a virtual processor through the use of software on a real machine, allowing Java software to execute under diverse operating systems, including UNIX, Windows NT, and MacIntosh.

Web browsers including Netscape Navigator® and Microsoft Internet Explorer® are referred to as Java-enabled browsers because they include a version of the JVM. Java applets are programs written in Java and configured to run within Java-enabled browsers. Handled in a manner similar to the way images are handled, Java applets may be displayed as part of a HyperText Mark Up Language (HTML) document. When an applet is loaded, it can present special effects, such as animation, graphics, and sound, perform real-time data updates and applications, and can interact with a user through a mouse, keyboard and various interface elements such as buttons, slides and text fields.

Java source code is compiled into bytecode using a Java compiler referred to as a Javac. Compiled Java programs are saved in files with the extension "class". When a Java-enabled Web browser recognizes that an applet has been requested, a Java interpreter processes the applet bytecode on the JVM. The Java programming language and environment is extensively described in "The Java Tutorial: Object-Oriented Programming for the Internet," by Mary Campione and Kathy Walrath, published by Addison-Wesley Pub Co (1996).

FIG. 1 illustrates a computer system in which the methods and apparatus of the present invention can be embodied. A network 120 includes a remote computer 110, e.g., a personal computer including such components as a central processing unit (CPU) 112, a display 114 and user input devices such as a keyboard 116 and a mouse 118. The remote computer 110 is connected to a server 130 of the network 120, as well as to a host computer 140. Those skilled in the art will appreciate that the remote computer 110 may take other forms than the personal computer illustrated; for example, the remote computer 110 may include a so-called "network computer," i.e., a Web-enabled terminal with little or no local disk storage, or other computing device such as a personal digital assistant (PDA), personal communications system (PCS), or the like. Those skilled in the art will also appreciate that the server 130 make take various forms including conventional personal computer type servers or similar devices which may be addressable as locations in a network and have the capability to store information. Although host computer 140 may take the form of a traditional mainframe computer running a conventional terminal application such as a 3270 application, those skilled in the art will appreciate that the host computer 140 may comprise various other apparatus that run applications that conduct input and output using a terminal-type interface.

Figure 2:
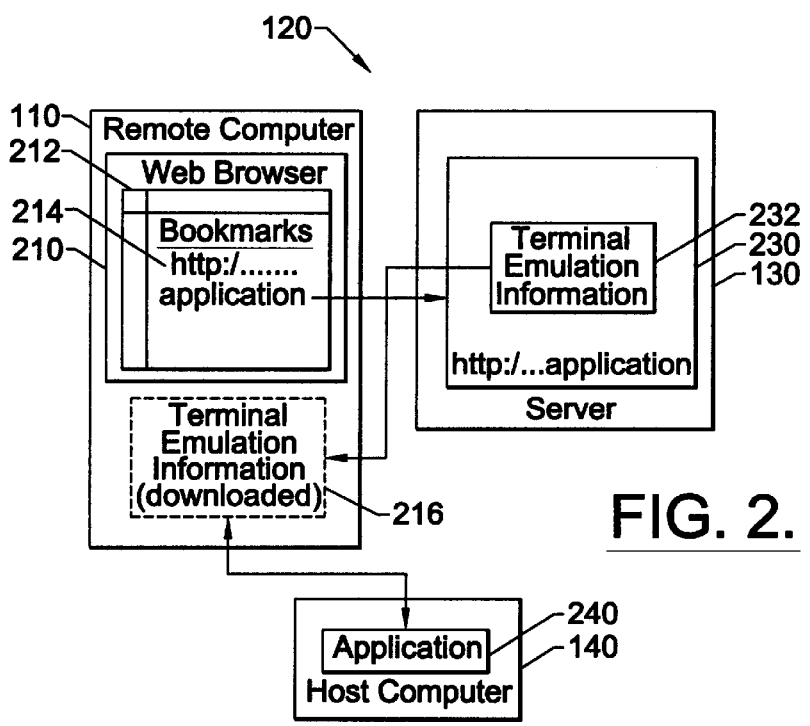
FIG. 2 is a schematic diagram illustrating a system for conducting sessions with a host-based application according to the present invention.

FIG. 2 illustrates an embodiment of the present invention, in particular, a client/server architecture used to provide a terminal interface to a host-based computer application from a remote terminal using terminal emulation information stored on a server external to the remote computer. A network 105 includes a remote computer 110 configured to download terminal emulation information 232 stored at a host access resource location 230, e.g., a storage location located at a server 130 that is addressable using a URL. For example, the terminal emulation information may be accessed by selecting a bookmark 214 displayed by a Web browser 210 running at the remote computer 110, or by selecting of a HTML link in a Web page displayed at the remote computer 110. In response to selection of the appropriate bookmark, the terminal emulation information 232 is downloaded to the remote computer 110 from the host access resource location 230.

The remote computer 110 is configured to process the downloaded terminal emulation information 216 to conduct a persistent session with an application 240 resident at the host computer 140, i.e., a session which persists when the remote computer 110 accesses a resource location in the network 105. For example, after the Web browser 210 accesses the host access resource location 230 and downloads the terminal emulation information 232, the downloaded terminal emulation information may be automatically processed to establish a session between the remote computer 110 and the host computer 140. The session established persists when the Web browser 210 accesses a resource location, for example, when the browser 210 reloads information, e.g., a Web page, from the host access resource location 230 or when the browser 210 loads information from another resource location in the network 105.

Figure 3:
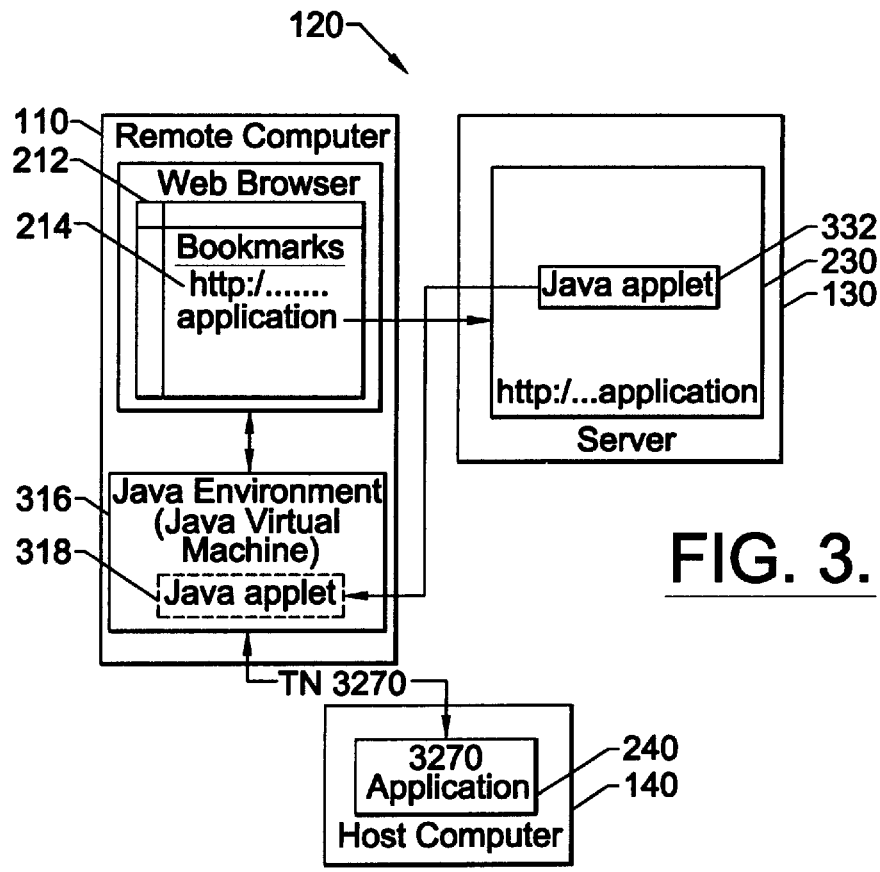
FIG. 3 is a schematic diagram illustrating a preferred embodiment of a system for conducting sessions with a host-based application according to the present invention.

A preferred embodiment of the present invention is illustrated in FIG. 3. The remote computer 110 is configured to produce a platform-independent common environment, for example, a Java environment 316 (or, in Java nomenclature, a Java Virtual Machine). The terminal emulation information includes a Java applet 332, which is stored on the server 130 at the host access resource location 230. The Java applet 332 is downloaded to the remote computer 110 to be processed under the Java environment 316 to establish and conduct a session between the remote computer 110 and the application 240 on the host computer 140. For example, processing of the downloaded Java applet 318 may cause the remote computer to establish a user interface for the application, as well as control communications between the remote computer 110 and the application 240 according to the protocol required by the application 240, e.g., a TN3270 protocol. Those skilled in the art will appreciate that although FIGS. 2 and 3 illustrate a direct connection between the remote computer 110 and the host computer 140, communications therebetween may occur through one or more intermediate devices. For example, a Java security framework may require connection of the remote computer 110 and the host computer 140 through a server.

Although the embodiments illustrated in FIGS. 2 and 3 involve downloading of an applet from a server 130 which is part of a network that includes the remote computer 110, the present invention can also be implemented by loading terminal emulation information at the remote computer 110 in other ways. For example, the terminal emulation information may comprise a Java applet that is stored at a local resource location at the remote computer 110, e.g., on a hard drive, diskette, CDROM, or similar storage medium. The locally stored terminal emulation information may loaded directly by the browser 210 without requiring a network transfer and used to conduct a persistent session between the remote computer 110 and the host application 240.

Figure 4:
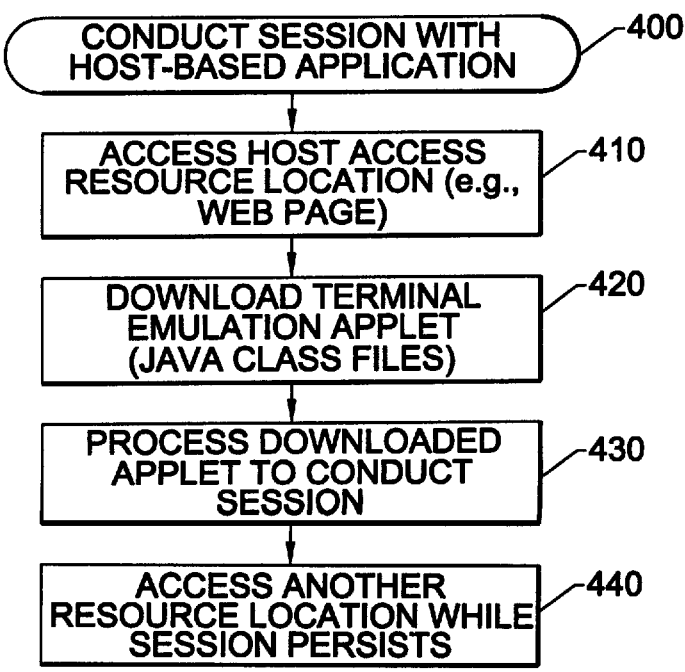
FIG. 4 is a flowchart illustration of operations for conducting a session with a host-based application according to the present invention.

FIG. 4 illustrates basic operations for conducting a persistent session between a remote computer and a host-based application according to the present invention (Block 400). A user at the remote computer provides a request to access the hostbased application by, for example, selecting an HTML link in a Web page displayed at the remote computer (Block 410). In response, terminal emulation information, e.g., a Java applet, is downloaded to the remote computer from a server in a network connected to the remote computer (Block 420). The downloaded terminal emulation information is then processed to conduct a persistent session between the remote computer and the application (Block 430), e.g., a session which persists when the remote computer accesses another Web page (Block 440). The processing of the downloaded emulation information may occur automatically after downloading, or may be delayed until an appropriate user command is submitted.

As known to those skilled in the art, a remote computer may access a Web page by establishing TCP/IP communications with a server hosting the Web page, more specifically, with a resource location identified by a Uniform Resource Locator (URL). Typically, the server is a personal computer, mainframe computer, minicomputer, or similar data processing device having a data processor and data storage capability, and data transferred between the remote computer and the server are processed according to the HyperText Transfer Protocol (HTTP). To access a Web page hosted at a server, a remote computer, via a Web browser or similar interface, sends a TCP/IP message to the server that represents a request for the Web page. Data for the Web page are transferred to the remote computer, and the Web page is generated on the display of the remote computer from the transferred objects. Accordingly, for purposes of the discussion herein, "Web page" may refer to both the resource location (URL) used to access a Web page, and the actual physical display of the Web page at a computer accessing the Web page.

As known to those of skill in the art, a Java applet may be embedded in an hypertext markup language (HTML) document via an "applet tag." This tag is used to describe the applet, its parameters, and its dimensions. When an applet tag is activated, the Web browser accessing the HTML document downloads code for the applet from a specified server, and executes the code on the computer at which the browser is operating. As will be appreciated by those skilled in the art, applet activation can be automatic, e.g., upon access to the HTML document, or may be activated by a user action such as selection of a button or similar object in the displayed document. Accordingly, establishment of a session as described above may occur upon access to a Web page having an applet tag embedded therein, or may be initiated by selection of an item on such a page. An extensive description of HTML is provided by the "HTML Reference Manual," published by Sandia National Laboratories (1996), available on the World Wide Web at http://www.sandia.gov/sci_compute/html_ref.html.

Figure 5:
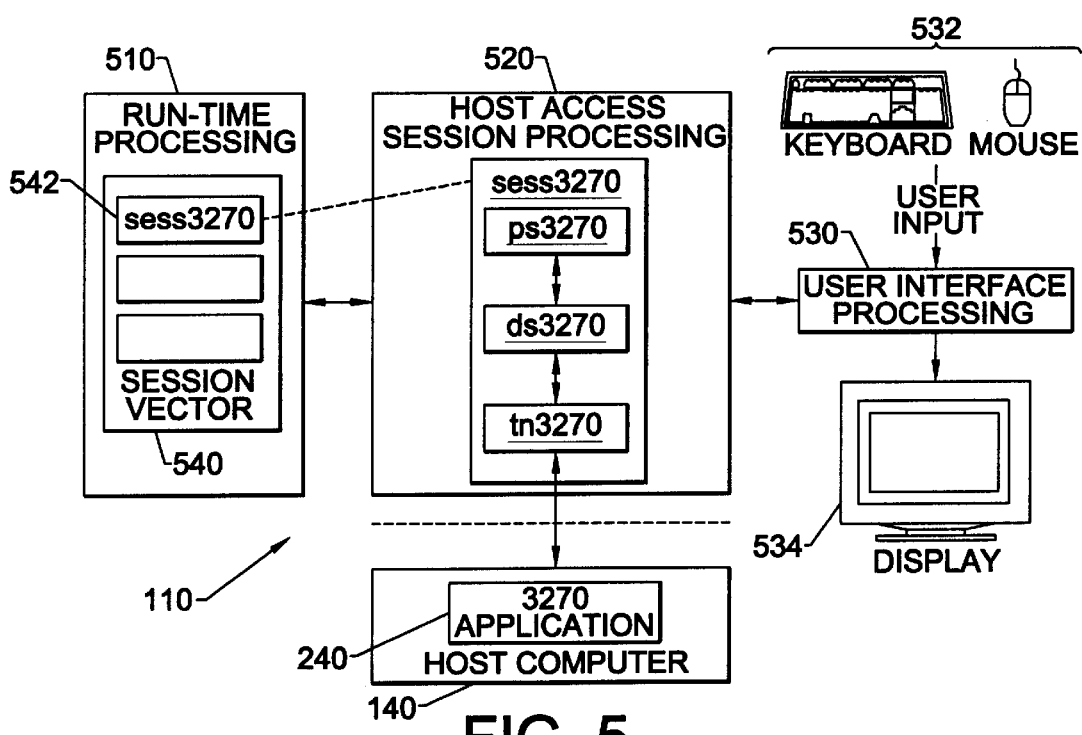
FIG. 5 is a schematic block diagram illustrating an exemplary object structure for conducting a session with a host-based application according to the present invention.

FIG. 5 illustrates an object structure for conducting persistent sessions according to the present invention, in particular, a structure employed in an IBM Host-On-Demand v1.0 product developed by the assignee of the present application. Processing of downloaded terminal emulation information as described above causes creation of host access processing means 520 for conducting a session between the remote computer 110 and the host-based application 240, more particularly, instantiation of a Session Object sess3270 that conducts a session between the remote computer 110 and the host-based application 240. According to the illustrated embodiment, the Session Object sess3270 further instantiates a plurality of host access processing objects including a Transport Object tn3270, a Data Stream Object ds3270 and a Presentation Space Object ps3270. The Transport Object tn3270 is responsible for session negotiation, termination, and flow control of 3270 data streams over sockets. Outbound 3270 data streams (host to Web user) are parsed in the Data Stream Object ds3270 into discrete tokens and passed onto the Presentation Space Object ps3270. The Presentation Space Object ps3270 maintains a 3270 presentation space at the remote computer 110, including data fields, by processing these tokens. The Presentation Space Object ps3270 also takes user input, updates the presentation space, and initiates inbound 3270 data streams (Web user to host). Inbound data streams are assembled by the Data Stream Object ds3270 with tokens obtained from the Presentation Space Object ps3270 and passed onto the Transport Object tn3270 for transport. These classes are glued together by the Session Object sess3270 to represent the complete state of a session. Multiple host connections may be created by instantiating multiple Session Objects, which may in turn be identified by a Session Vector 540 maintained at the remote computer 110. Each host connection may be tracked in the Session Vector 540 as a separate Session Object instance.

In greater detail, the Session Object sess3270 of the illustrated embodiment establishes and maintains a connection with the host-based application 240. The behavior and characteristics of this connection may be controlled through a set of key properties which may include host name and port number, terminal connection types, session identifier, presentation space size, host code pages, host control characters, and the like. In object-oriented terms, the Session Object sess3270 may be considered a master class that instantiates other host access objects such as the Transport Object tn3270, the Data Stream Object ds3270 and the Presentation Space Object ps3270. The Session Object may have methods which are accessible to these host access objects, i.e., "internal" methods, as well methods accessible to other applications resident at the remote computer 110, i.e., "external" methods. External methods may include starting or stopping a session, returning property values, and returning identifiers of objects that provide external methods. Internal methods may include setting property values, starting and stopping error reporting, and returning identifiers of other objects.

The Presentation Space Object ps3270 of the illustrated embodiment maintains a virtual host display screen for a session. The behavior and characteristics of the presentation space may be based on terminal connection type and presentation space size session properties. The Presentation Space Object ps3270 holds formatted screen data and attributes and provides methods for extracting and entering information in the presentation space. External methods for this object may include getting and setting presentation space content, getting and setting field content, getting field attributes, navigating fields, accepting keyboard, function key and other user inputs, and the like. These external methods may be used by the Data Stream Object ds3270, as well as by other applications resident at the remote computer 110, to assemble data streams for communication to the application 240.

The Data Stream Object ds3270 of the illustrated embodiment parses and assembles host data streams. Methods for this object may include sending and receiving host application format data streams. For example, the Transport Object tn3270 may use a "receive data" method of the Data Stream Object ds3270 to pass a host data stream from the application 240 onto the Presentation Space Object ps3270. Similarly, the Presentation Space Object ps3270 may use a "send data" method of the Data Stream Object ds3270 to request assembly of a data stream for transmission to the host application 240 via the Transport Object tn3270.

The Transport Object tn3270 sends and receives data streams according to a communications protocol, e.g., TCP/IP, used by the host computer 140. The behavior and characteristics of the Transport Object tn3270 may be controlled by properties such as protocol type, host name, and port number. Internal methods may include reading an input stream, writing and output stream, and stopping transport. For example, a "read input stream" method may be used by the Transport Object tn3270 to extract a host application format data stream from data which is formatted according to the communications protocol used by the host computer 140.

The result is an object structure which is configured to conduct a persistent session from the Web user to the host-based application, and which may be accessed by other applications at various levels. For example, user interface processing 530 and run-time environment processing 510 can be logically separated from the host access session processing 520. Applications such as user interface processing 530 may include several objects which, for example, construct a visual display on the Web user's display 534 and which process inputs from input devices 532. These objects may be attached to the session object sess3270 from its default instantiation method, and may utilize the methods of the host access processing objects. Similarly, run-time environment processing 510 can provide a default run time control that initiates sessions, maintains session limit, tracks user interface options, and resolves file references. The open structure of the host access processing 520 allows further tailoring and extension of processing for new Web applications.

Operations according to various aspects of the present invention, in particular, exemplary operations under the structure illustrated in FIG. 5, are illustrated in the flowchart illustrations of FIGS. 6–9. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory that can direct a processor or other programmable data processing apparatus to function in a particular manner, such that the instructions stored in the computer-readable memory produce an article of manufacture including instruction means which implement the functions specified in the flowchart block or blocks.

The computer program instructions may also be executed by a processor or other programmable data processing apparatus to cause a series of operational steps to be performed by the processor or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

Figure 6:
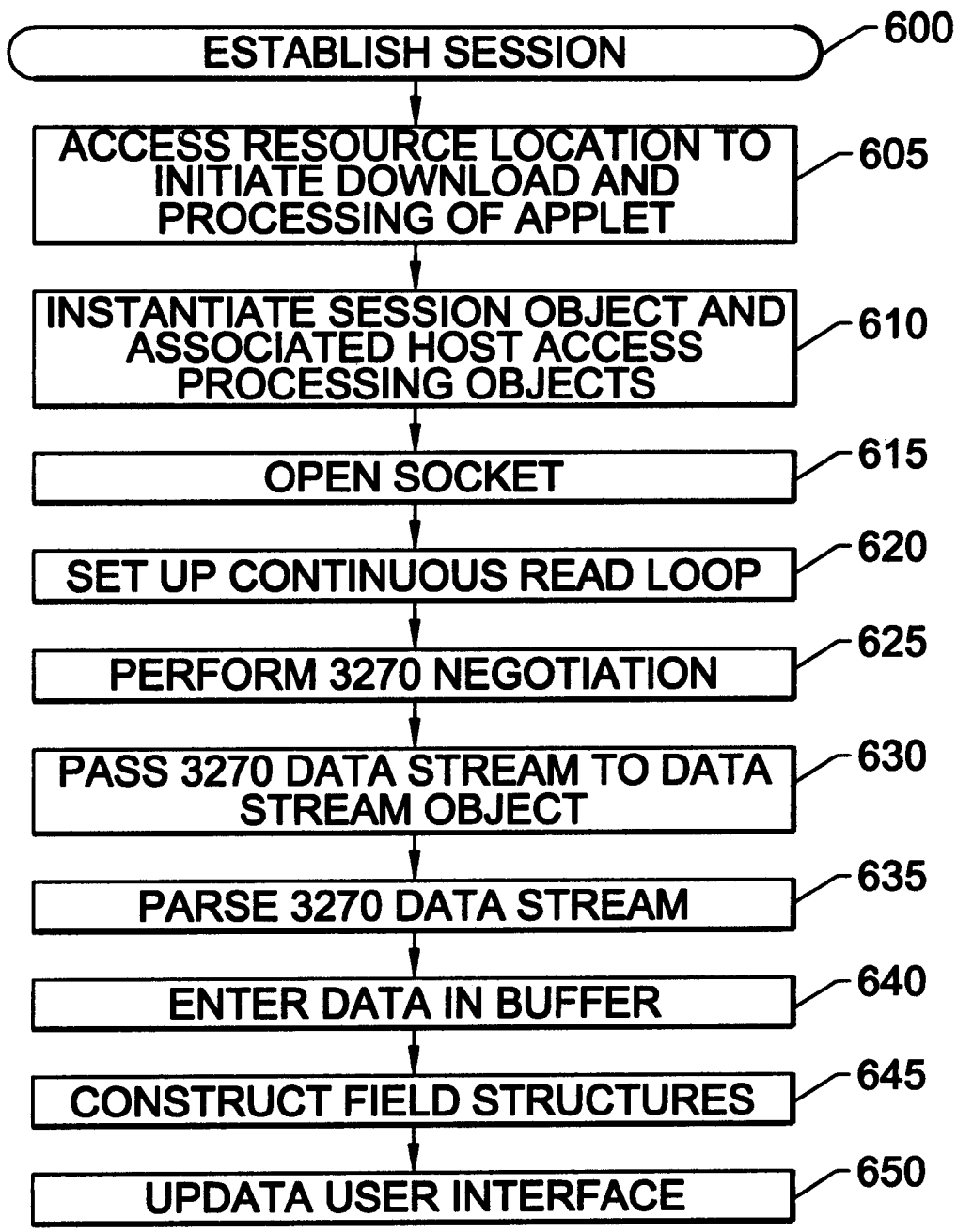
FIGS. 6–9 are flowchart illustrations of exemplary operations for conducting a session with a host-based application according to the present invention.

Referring now to FIG. 6, to initiate a session (Block 600), a user at the remote computer opens a URL to initiate a download of a Java applet and processing of the downloaded applet (Block 605). The processing of the applet instantiates a Session Object, which in turn instantiates host access processing objects including a Transport Object, Data Stream Object and Presentation Space Object (Block 610). The Transport Object opens a socket connection to a 3270 server port (Block 615), setting up a continuous read loop to the host computer (Block 620), performing 3270 negotiation (Block 625), and passing 3270 data streams to the Data Stream Object (Block 630). The 3270 data streams may then be parsed (Block 635), the data entered in a buffer maintained by the Presentation Space Object (Block 640), and field structures constructed (Block 645). A user interface is then updated at the end of the data stream (Block 650), e.g., a data input/output screen is "painted."

Figure 7:
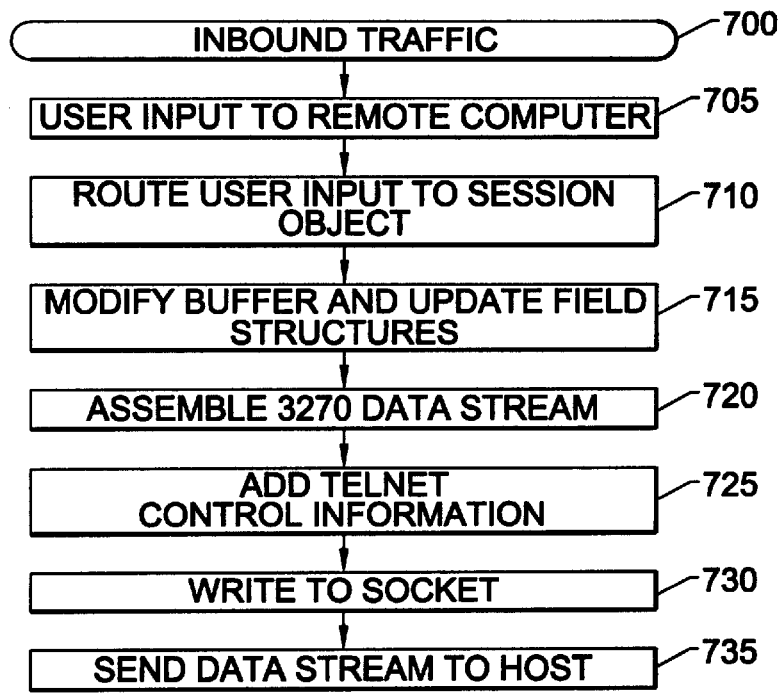

FIG. 7 illustrates operations for conducting inbound (Web user to host) traffic (Block 700). A user provides data input at the remote computer (Block 705). The data is routed to the Session Object and handed over to the Presentation Space Object (Block 710), after which data in the buffer is modified and field structures updated (Block 715). A 3270 data stream is then assembled from the data (Block 720), a Telnet header and trailer added (Block 725), and the assembled data stream written to a socket opened for the 3270 communications to the host by the Transport Object (Block 730). The data stream then flows to the host computer according to the host computer's communications protocol (Block 735)

Figure 8:
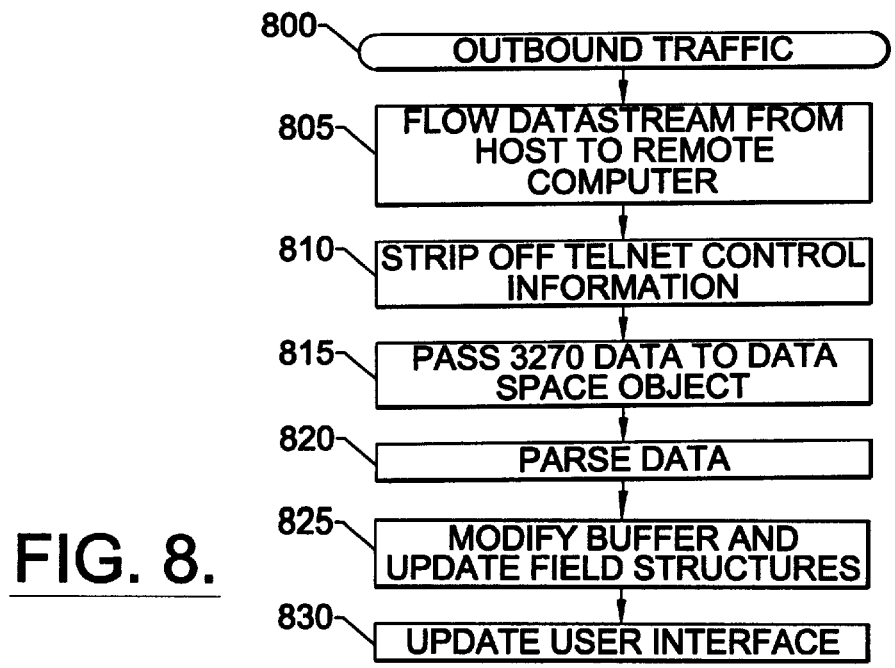

FIG. 8 illustrates operations for conducting outbound (host to Web user) traffic (Block 800). A Telnet data stream flows from the host computer to the remote computer over a socket opened for such a purpose (Block 805). The Transport Object removes Telnet control information from the data stream, and the remaining 3270 data passed to the Data Stream Object (Block 810). The data is parsed (Block 815), and the data buffer and field structures maintained by the Presentation Space Object are modified based on the parsed data (Block 820). The user interface is then updated (Block 825).

Figure 9:
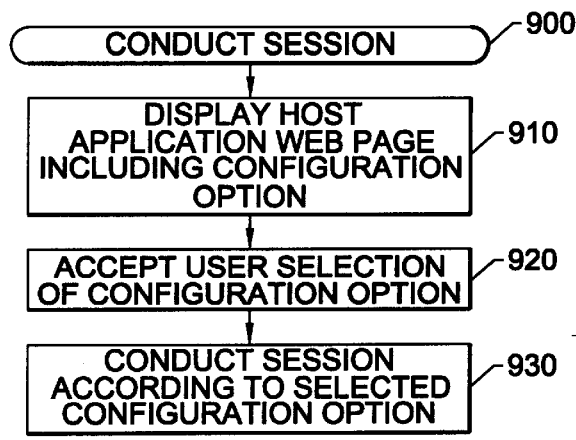
Figure 10:
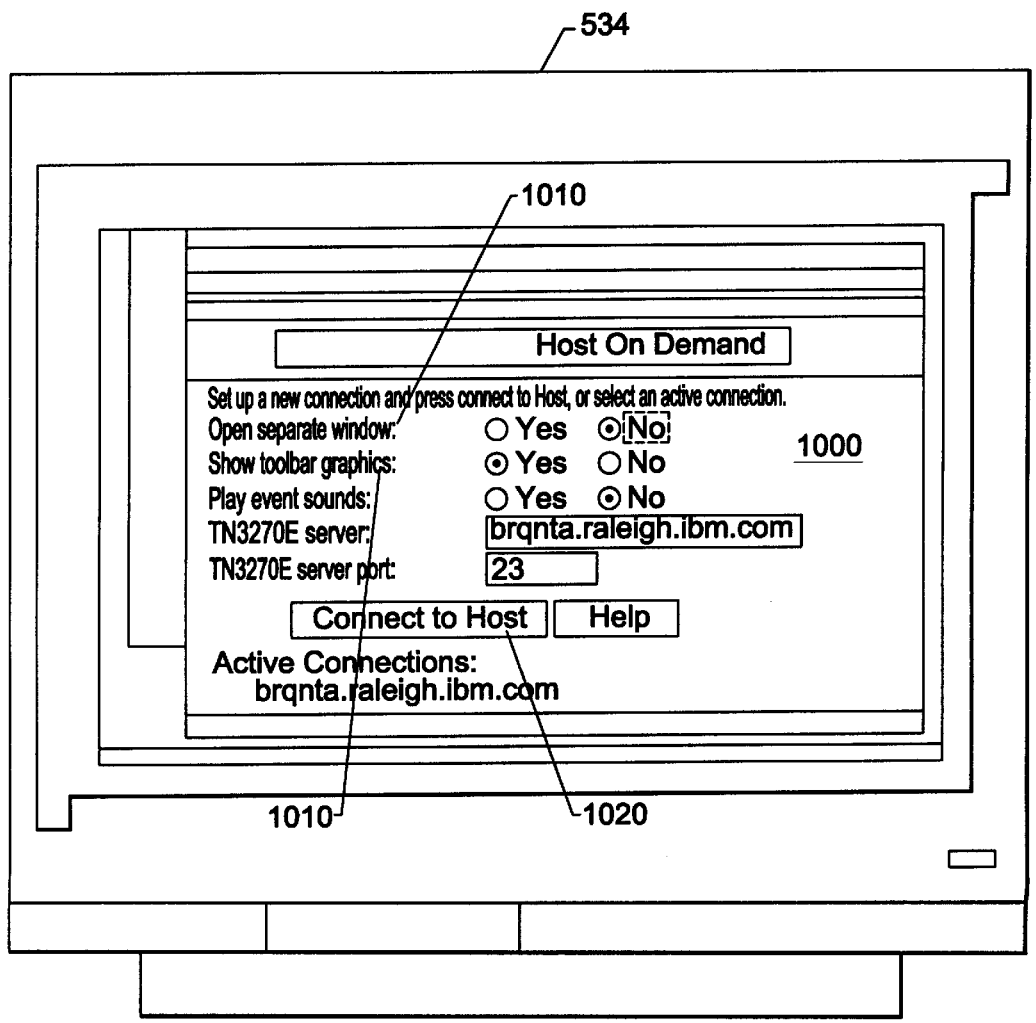
FIG. 10 illustrates a host access Web page according to the present invention.

FIG. 9 illustrates operations for conducting a session having a user-specified configuration according to another aspect of the present invention (Block 900). A browser resident at a remote computer is caused to display a host access Web page including a session configuration option (Block 910). A user selects a configuration option (Block 920), and a session is established between the remote computer and the host application according to the selected configuration option (Block 930). As illustrated in FIG. 10, a host access Web page 1000 may include a variety of user-selectable configuration options, here shown as mouse-selectable objects 1010 in the Web page 1000. After selection of the desired options, a user may then command establishment of a session configured according to the selected options by, for example, selecting an appropriate command button 1020 in the Web page 1000.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A system for conducting a session with an application resident on a host computer, the host computer configured to communicate according to a host communications protocol, the system comprising:

a computer which is operatively associated with the host computer and which is part of a network including a plurality of resource locations; and means for accessing information at said plurality of resource locations from said computer, said means for accessing including means for loading terminal emulation information at said computer from a host access resource location of said plurality of resource locations, wherein said computer is configured to process the loaded terminal emulation information to create a process at the computer that is operative to conduct a session between said computer and the application, the session operative to persist when said computer subsequently accesses a resource location of said plurality of resource locations, the process operative to communicate with the host computer according to the host communications protocol without requiring a protocol conversion between the computer and the host computer.

2. A system according to claim 1:

wherein said means for accessing comprises a browser, resident at said computer and operative to access said plurality of resource locations, which accesses said terminal emulation information at said host access resource location; and wherein said created process is operative to conduct a session between said computer and the application that persists when said browser subsequently accesses a resource location of said plurality of resource locations.

3. A system according to claim 1, wherein said means for accessing comprises means for downloading the terminal emulation information from a server of said network.

4. A system according to claim 1:

wherein said computer is configured to produce a common environment capable of being produced under a plurality of different computer operating systems;

wherein said terminal emulation information comprises terminal emulation configured to be processed under said common environment; and wherein said computer is configured to process the loaded terminal emulation information under said common environment and thereby conduct a session between said computer and the application.

5. A system according to claim 1:

wherein said common environment comprises a Java environment;

wherein said terminal emulation information comprises a Java applet;

wherein said means for accessing comprises means, responsive to a request from said computer, for loading the Java applet at said computer; and wherein said computer is configured to process the loaded Java applet under said Java environment to conduct a session between said computer and the application.

6. A system according to claim 1, wherein said computer is configured to automatically process the loaded terminal emulation information in response to loading of the terminal emulation information at said computer.

7. A system according to claim 1, wherein the terminal emulation information is configured to cause the computer to instantiate a Session Object when processed at said computer, said Session Object being configured to conduct the session between the computer and the application.

8. A system according to claim 7, wherein the Session Object is configured to instantiate a plurality of host access processing objects which conduct the session between the computer and the application, said host access processing objects having methods which are accessible to an application resident at said computer.

9. A system according to claim 8, wherein the application resident at the host computer is configured to communicate according to a host application data stream format, wherein the host computer is configured to communicate according to a host communications protocol, and wherein said plurality of host access processing objects comprises:

a Presentation Space Object which maintains a presentation space at the computer, said Presentation Space Object being configured to accept information for presentation in said presentation space and to extract information from said presentation space;

a Data Stream Object, operatively associated with said Presentation Space Object, which is configured to receive extracted information from said Presentation Space Object and produce a data stream formatted according to said host application data stream format therefrom, and which is configured to receive a data stream formatted according to said host application data stream format and provide information to said Presentation Space Object therefrom; and a Transport Object, operatively associated with said Data Stream Object and with the host computer, which is configured to receive a data stream formatted according to said host application data stream format from said Data Stream Object and provide a data stream formatted according to a host communications protocol to the host computer therefrom, and which is configured to receive a data stream formatted according to the host communications protocol from the host computer and to provide a data stream formatted according to the host application data stream format to said Data Stream Object therefrom.

10. A system according to claim 7, wherein the terminal emulation information is configured to cause the computer to instantiate a Session Vector for identifying the instantiated Session Object.

11. A system according to claim 1, wherein the application is configured to communicate according to a Telnet protocol, and wherein the terminal emulation information causes said computer to communicate with the application according to said Telnet protocol.

12. A system according to claim 2, wherein the terminal emulation information is configured to cause said browser to display a host access Web page including a session configuration option and to provide means for accepting a user selection of said session configuration option from said host access Web page, and wherein the terminal emulation information is configured to cause said computer to conduct the session according to the selected configuration option.

13. An apparatus for conducting a session with an application resident on a host computer, the host computer configured to communicate according to a host communications protocol, the apparatus comprising:

a computer configured to access a plurality of resource locations of a network including the computer, to load terminal information at the computer from a host access resource location of the network and to process the loaded terminal emulation information; and terminal emulation information, loaded at the computer, which is configured to be processed at the computer to create a process at the computer that is operative to conduct a session between said computer and the application, the session operative to persist when said computer subsequently accesses a resource location of the plurality of resource locations, the created process operative to communicate with the host computer according to the host communications protocol without requiring a protocol conversion between the computer and the host computer.

14. An apparatus according to claim 13, further comprising a browser, resident at said computer and configured to access the plurality of resource locations, which accesses the terminal emulation information at the host access resource location, and wherein the created process is operative to conduct a session between said computer and the application that persists when said browser subsequently accesses a resource location of the plurality of resource locations.

15. An apparatus according to claim 13, wherein said computer is configured to download the terminal emulation information from a server of the network.

16. An apparatus according to claim 13:
wherein the computer is configured to produce a common environment capable of being produced under a plurality of different computer operating systems;
wherein said computer is configured to process the loaded terminal emulation information under the common environment to thereby conduct a session between said computer and the application.

17. An apparatus according to claim 16:
wherein said common environment comprises a Java environment;
wherein said computer is configured to download a Java applet and to process the downloaded Java applet under the Java environment to conduct a session between said computer and the application.

18. An apparatus according to claim 15, wherein said computer is configured to accept a user input and to communicate a request to the server to download said terminal emulation information in response to the user input.

19. An apparatus according to claim 13, wherein said computer is configured to automatically process said terminal emulation information in response to loading of said terminal emulation information.

20. An apparatus according to claim 13, wherein said terminal emulation information is configured to cause said computer to instantiate a Session Object when processed at said computer, said Session Object being configured to conduct the session between said computer and the application.

21. An apparatus according to claim 20, wherein the Session Object is configured to instantiate a plurality of host access processing objects which conduct the session between the computer and the application, said host access processing objects having methods which are accessible to an application resident at said computer.

22. An apparatus according to claim 21, wherein the application resident at the host computer is configured to communicate according to a host application data stream format, wherein the host computer is configured to communicate according to a host communications protocol, and wherein said plurality of host access processing objects comprises:

a Presentation Space Object which maintains a presentation space at said computer, said Presentation Space Object being configured to accept information for presentation in said presentation space and to extract information from said presentation space;

a Data Stream Object, operatively associated with said Presentation Space Object, which is configured to receive extracted information from said Presentation Space Object and produce a data stream formatted according to said host application data stream format therefrom, and which is configured to receive a data stream formatted according to said host application data stream format and provide information to said Presentation Space Object therefrom; and a Transport Object, operatively associated with said Data Stream Object and with the host computer, which is configured to receive a data stream formatted according to said host application data stream format from said Data Stream Object and provide a data stream formatted according to a host communications protocol to the host computer therefrom, and which is configured to receive a data stream formatted according to the host communications protocol from the host computer and to provide a data stream formatted according to the host application data stream format to said Data Stream Object therefrom.

23. An apparatus according to claim 20, wherein said terminal emulation information is configured to cause said computer to instantiate a Session Vector for identifying the instantiated Session Object.

24. An apparatus according to claim 13, wherein the application is configured to communicate according to a Telnet protocol, and wherein said terminal emulation information is configured to cause said computer to communicate with the application according to the Telnet protocol.

25. An apparatus according to claim 14, wherein said terminal emulation information is configured to cause said browser to display a host access Web page including a session configuration option and to provide means for accepting a user selection of said session configuration option from said host access Web page, and wherein said terminal emulation information is configured to cause said computer to conduct the session according to the selected configuration option.

26. A computer program product for conducting a session with an application resident at a host computer, the computer program product comprising:

a computer-readable program storage medium having computer-readable terminal emulation information embodied therein which is configured to be loaded at a computer connected to the host computer from a host access resource location of a network including the computer, and which is configured to be processed at the computer to thereby create a process at the computer that is operative to conduct a session with the application which persists when the computer subsequently accesses a resource location of the plurality of resource locations, the created process operative to communicate with the host computer according to the host communications protocol without requiring a protocol conversion between the computer and the host computer.

27. A computer program product according to claim 26, wherein said computer-readable terminal emulation information comprises a Java applet configured to be processed under a Java environment at the computer.

28. A computer program product according to claim 26, wherein said computer-readable terminal information is configured to cause the computer to automatically establish a session with the application in response to loading of the computer-readable terminal emulation information at the computer.

29. A computer program product according to claim 26, wherein the computer-readable terminal emulation information is configured to cause the computer to instantiate a Session Object when processed at the computer, the Session Object being configured to conduct a session between the computer and the application.

30. A computer program product according to claim 29, wherein the Session Object is configured to instantiate a plurality of host access processing objects which conduct the session between the computer and the application, said host access processing objects having methods which are accessible to an application resident at said computer.

31. A computer program product according to claim 30, wherein the application resident at the host computer is configured to communicate according to a host application data stream format, wherein the host computer is configured to communicate according to a host communications protocol, and wherein said plurality of host access processing objects comprises:
    a Presentation Space Object which maintains a presentation space at the computer, said Presentation Space Object being configured to accept information for presentation in said presentation space and to extract information from said presentation space;
    a Data Stream Object, operatively associated with said Presentation Space Object, which is configured to receive extracted information from said Presentation Space Object and produce a data stream formatted according to said host application data stream format therefrom, and which is configured to receive a data stream formatted according to said host application data stream format and provide information to said Presentation Space Object therefrom; and
    a Transport Object, operatively associated with said Data Stream Object and with the host computer, which is configured to receive a data stream formatted according to said host application data stream format from said Data Stream Object and provide a data stream formatted according to a host communications protocol to the host computer therefrom, and which is configured to receive a data stream formatted according to the host communications protocol from the host computer and to provide a data stream formatted according to the host application data stream format to said Data Stream Object therefrom.

32. A computer program product according to claim 29, wherein said computer-readable terminal emulation information is configured to cause the computer to instantiate a Session Vector for identifying the instantiated Session Object.

33. A computer program product according to claim 26, wherein the application is configured to communicate according to a Telnet protocol, and wherein said computer-readable terminal emulation information is configured to cause the computer to communicate with the application according to the Telnet protocol.

34. A computer program product according to claim 26, wherein said computer-readable terminal emulation information is configured to cause display of a host access Web page including a session configuration option at the computer, to provide means for accepting a user selection of said session configuration option from said host access Web page, and to cause the computer to conduct the session according to the selected configuration option.

35. A method of conducting a session with an application resident on a host computer, the host computer configured to communicate according to a host communications protocol, the method comprising the steps of:
    loading terminal information at a computer, operatively associated with the host computer and which is part of a network including a plurality of resource locations, from a host access resource location of the plurality of resource locations;
    processing the loaded terminal emulation information to create a process at the computer that is operative to conduct a session between the computer and the application, the created process operative to conduct the session according to the host communications protocol without requiring a protocol conversion between the computer and the host computer; and then
    accessing a resource location of the plurality of resource locations from the computer while the session persists.

36. A method according to claim 35, wherein the computer has a browser resident thereat which is operative to access the plurality of resource locations, and:
    wherein said step of loading comprises the step of accessing the host access resource location from the browser; and
    wherein said step of accessing comprises the step of accessing a resource location of the plurality of resource locations from the browser while the session persists.

37. A method according to claim 35, wherein said step of loading comprises the step of downloading the terminal emulation information from a server of the network.

38. A method according to claim 35, further comprising the step of producing a common environment capable of being produced under a plurality of different computer operating systems at the computer, and wherein said step of processing comprises the step of processing the downloaded terminal emulation information under the common environment to thereby conduct a session between the computer and the application.

39. A method according to claim 35, wherein the common environment comprises a Java environment, wherein the terminal emulation information comprises a Java applet, and:
    wherein said step of loading comprises the step of loading the Java applet at the computer; and
    wherein said step of processing comprises the step of processing the loaded Java applet under the Java environment to conduct a session between the computer and the application.

40. A method according to claim 35, wherein said step of processing comprises the step of automatically processing the loaded terminal emulation information in response to loading of the terminal emulation information.

41. A method according to claim 35, wherein said step of processing comprises the step of instantiating a Session Object at the computer, the Session Object being configured to conduct the session between the computer and the application.

42. A method according to claim 41, wherein said step of processing comprises the step of instantiating a plurality of host access processing objects from the Session Object, the host access processing objects being configured to conduct the session between the computer and the application and having methods which are accessible to an application resident at said computer.

43. A method according to claim 42, wherein the application resident at the host computer is configured to communicate according to a host application data stream format, wherein the host computer is configure to communicate according to a host communications protocol, and wherein said step of instantiating a plurality of host access processing objects comprises the steps of:

instantiating a Presentation Space Object which maintains a presentation space at the computer, said Presentation Space Object being configured to accept information for presentation in said presentation space and to extract information from said presentation space;

instantiating Data Stream Object, operatively associated with said Presentation Space Object, which is configured to receive extracted information from said Presentation Space Object and produce a data stream formatted according to said host application data stream format therefrom, and which is configured to receive a data stream formatted according to said host application data stream format and provide information to said Presentation Space Object therefrom; and instantiating a Transport Object, operatively associated with said Data Stream Object and with the host computer, which is configured to receive a data stream formatted according to said host application data stream format from said Data Stream Object and provide a data stream formatted according to a host communications protocol to the host computer therefrom, and which is configured to receive a data stream formatted according to the host communications protocol from the host computer and to provide a data stream formatted according to the host host application data stream format to said Data Stream Object therefrom.

44. A method according to claim 41, further comprising the step of instantiating a Session Vector which identifies the instantiated Session Object.

45. A method according to claim 35, wherein the application is configured to communicate according to a Telnet protocol, and wherein said step of processing comprises the step of causing the computer to communicate with the application according to the Telnet protocol.

46. A method according to claim 36, wherein said step of processing comprises the steps of:

causing the browser to display a host access Web page including a session configuration option;

accepting a user selection of said session configuration option from said host access Web page; and conducting the session according to the selected configuration option.

* * * * *